United States Patent [19]

Reese

[11] 4,135,949

[45] Jan. 23, 1979

[54] SAFETY INTERLOCK FOR PIPELINE PIG LAUNCHER AND RECEIVER

[75] Inventor: Herbert E. Reese, Bartlesville, Okla.

[73] Assignee: Phillips Petroleum Company, Bartlesville, Okla.

[21] Appl. No.: 687,477

[22] Filed: May 18, 1976

[51] Int. Cl.² .............................................. B08B 7/04
[52] U.S. Cl. .............................. 134/18; 15/104.06 A; 134/8; 134/22 R; 137/268
[58] Field of Search .................... 134/18, 8, 22 R; 15/104.06 A, 3.5, 3.51; 137/268, 391

[56] References Cited

U.S. PATENT DOCUMENTS

| | | | |
|---|---|---|---|
| 2,589,170 | 3/1952 | Ver Nooy | 15/104.06 A |
| 2,965,125 | 12/1960 | Osborne et al. | 137/268 |
| 3,266,076 | 8/1966 | Surber | 15/104.06 A |
| 3,384,512 | 5/1968 | Frederick et al. | 134/8 |
| 3,562,014 | 2/1971 | Childers et al. | 134/8 |
| 3,611,467 | 10/1971 | Hinz | 15/104.06 A |
| 3,664,356 | 5/1972 | Grove et al. | 137/268 |
| 3,676,091 | 7/1972 | Fraser et al. | 134/8 |
| 3,682,186 | 8/1972 | Howe | 15/104.06 A |
| 3,746,027 | 7/1973 | Elliott | 137/268 |
| 3,953,157 | 9/1960 | Osborne et al. | 137/268 |

*Primary Examiner*—Richard V. Fisher
*Assistant Examiner*—George C. Yeung

[57] ABSTRACT

A method and apparatus is provided for interlocking the controls on flow control valve process lines entering or leaving a pipeline pig launcher or receiver to prevent opening of the launcher-receiver closure when there is pressure in the launcher-receiver vessel and to prevent inadvertent admission of flow into the vessel while the closure is not in place.

9 Claims, 1 Drawing Figure

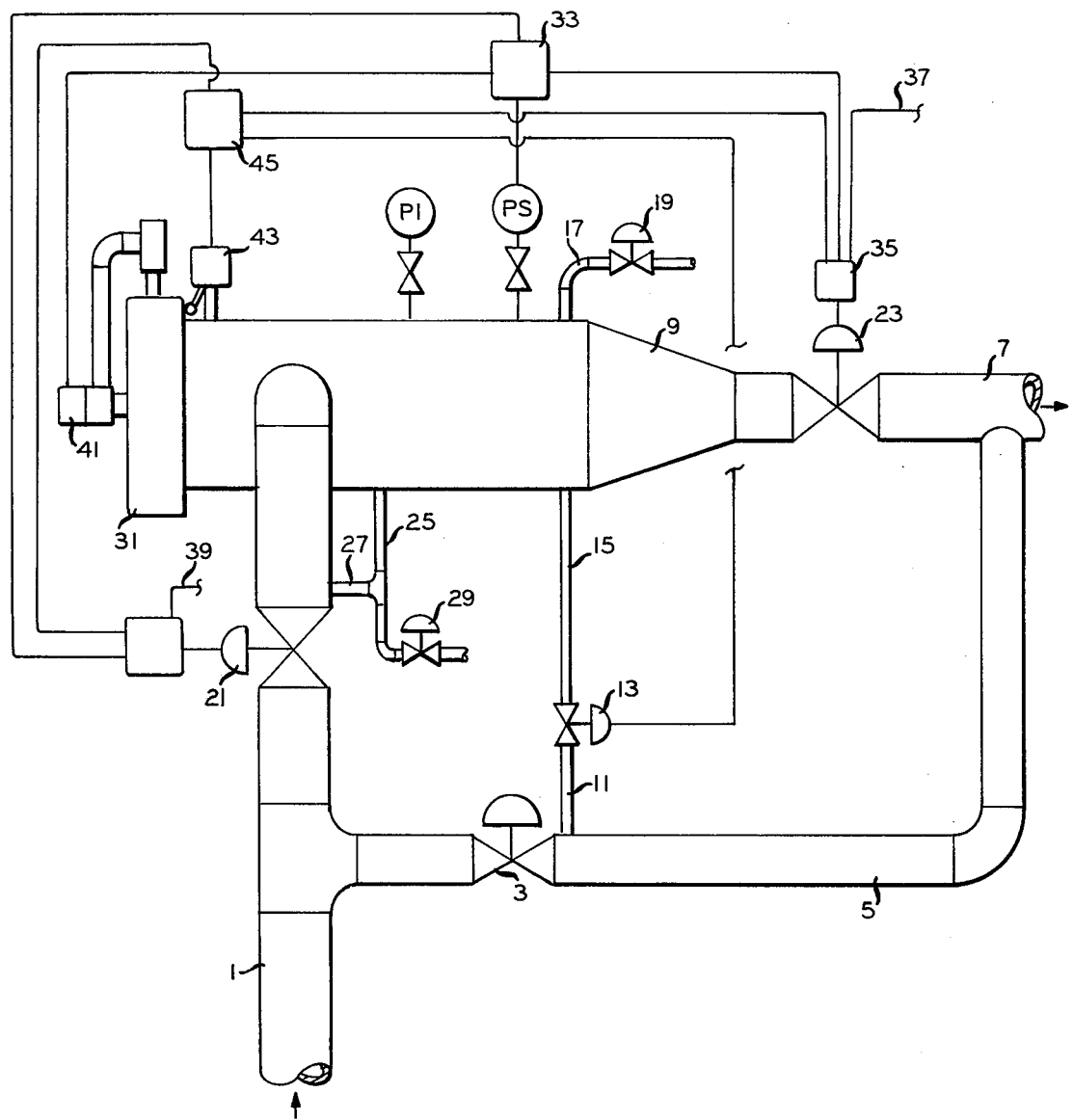

SAFETY INTERLOCK FOR PIPELINE PIG LAUNCHER AND RECEIVER

BACKGROUND OF THE INVENTION

This invention relates to the safe operation of vessels that must be opened to the atmosphere as part of the operation. In one of its aspects this invention relates to the prevention of flow of operating materials into a vessel while the vessel is opened. In another of its aspects this invention relates to the prevention of opening of a vessel while the vessel is pressurized. More particularly, the invention relates to the safe operation of a pipeline pig launcher-receiver. In a narrow aspect the invention relates to a safety interlock system for a pipeline pig launcher-receiver having a dismountable closure.

The use of pipeline pigs is well known in the art. These devices which usually comprise two spaced-apart cup-shaped members suitably sized to provide sufficient blockage in a pipeline to allow them to be moved along the interior of the pipeline by fluid pressure are used as means for cleaning deposits from the inside of pipelines, as spacers between different types of flowing material to minimize contamination, and can be used to create a complete blockage of a pipeline for pressure testing purposes. Adequately to use these devices in fairly continuous service, pipelines are often equipped with pipeline pig launching or receiving stations as means for easily inserting the devices into a pipeline or removing them from the pipeline.

Since most pipelines operate with a relatively high fluid pressure in lines of thirty inch diameter or even more, a pig launching or receiving station can have a considerable fluid capacity, for instance, a thirty inch diameter pipeline can have a forty-two inch diameter station which usually will be of length considerably greater than the diameter of the pipe. While the inadvertent opening of such a receiver while it is full of fluid, particularly a liquid, could be a hazard to operating personnel and to the environment, the hazard both to personnel and the environment is greatly increased if there is a possibility of the inadvertent opening of a flow control valve allowing operating fluid to enter the vessel while the vessel is open to the atmosphere. I have developed an interlocking safety system which seeks to avoid the possibility of leakage from the pressured process lines into the vessel when the vessel is open and also seeks to prevent the opening of the system to atmosphere when the vessel is pressurized.

It is therefore an object of this invention to provide a safety interlock system for a vessel that can be opened to the atmosphere and that is separated from pressurized operating lines containing fluids by a system of valves. It is another object of this invention to provide a method and apparatus by which flow into a pipeline pig launcher-receiver can be prevented when this vessel is open to the atmosphere. It is another object of the invention to provide method and apparatus preventing the opening of a pipeline pig launcher-receiver while there is pressure within the vessel.

Other aspects, objects and the various advantages of this invention will become apparent to those reading this disclosure and the appended claims.

STATEMENT OF THE INVENTION

A safety interlock apparatus is provided in a system containing a vessel such as a pipeline pig launching system comprising a launching barrel with a removable closure and interconnecting lines and valves for pressuring the vessel with fluid. In the system which consists of a vessel having an inlet line containing a flow control valve and an outlet line containing a flow control valve a means is provided for generating a signal indicative of an operating condition of the vessel with the control valve on the outlet line and the control valve on the inlet line responsive to this signal automatically to effect a closed position as the operating condition passes a predetermined limit and to maintain the closed position until the operating condition is re-established within the predetermined limit.

In one embodiment of the invention a means is provided for generating a signal indicative of the pressure within the barrel of the launching-receiving vessel. Upon receipt of a signal indicating that the operating pressure has decreased below a predetermined limit the control valves automatically act to effect the closed position and are maintained in this condition until there is an indication that the pressure within the vessel has surpassed a selected minimum.

In another embodiment of the invention the removal of the closure through which access is gained to the vessel causes generation of a signal to which the control valves on inlet and outlet lines to the vessel respond by automatically acting to effect the closed position and maintain this closed position until the signal is removed by returning the closure to its fixed position.

The two embodiments described above can be used as alternative operating conditions that must be satisfied to permit operation of control valves on flow lines leading into the vessel or the control valves can be set so that both conditions must be satisfied to allow operation of the valves.

It can readily be seen that either of the embodiments set out above will effectively safeguard against introduction of fluid into a vessel while the vessel is open to the atmosphere. Additional advantages have been found, however, in the use of pressure indication in a safety interlock system for protecting of vessels such as a pipeline pig launcher-receiver against operational errors when the vessel is being opened. It has been found that using a screw-type closure such as that commonly used on the launching barrel of pipeline pig launcher-receivers that the pressure within the vessel must drop below about 1 psig to allow the pressure on the threads to be readily overcome to unscrew the closure. To be doubly safe in a system using indicated pressure as the criterion for closing flow valves into the system this invention provides in an additional embodiment the use of an electric locking system on the closure for the vessel which prevents an opening operation of the closure until the pressure in the vessel has decreased below a predetermined minimum.

Equipment necessary for producing results by the method of this invention is known to those skilled in the art. This disclosure and the appended claims provide the knowledge by which the equipment can be combined to produce the desired results.

By the process of this invention operating conditions other than the pressure within the operating vessel or the implacement of a closure on the vessel can be used as the operating criterion. For the purposes of this disclosure the aforenamed conditions have been found readily operable and, partly because of the additional benefits described above, a system depending on the pressure within the vessel is preferred. Using the pressure-type system it has been found that, although any positive pressure can be used as the setpoint for closing valves controlling flow into and out of the system, pressures of up to about ten pounds are preferred and a pressure of about 5 psig is most preferred because of convenience.

The operation of this invention can best be understood in conjunction with the drawing which is a schematic representation of a pipeline pig launching system protected by a safety interlock apparatus.

Referring to the drawing, in normal operation flow of fluid through this system is from line 1 through valve 3 and line 5 to line 7. When a pig is to be launched into the pipeline it is put in position in the barrel 9 of the launching system, the barrel is pressurized by admitting flow through line 11, valve 13 and line 15 with venting of gases through line 17 and valve 19. After pressurizing, valves 21 and 23 can be opened as valve 3 is closed thereby byassing flow through the launching system. After launching, the valves can be reset so that the flow is shifted back through the main system by opening valve 3 while simultaneously closing valves 21 and 23.

To prepare the barrel 9 of the launching system for opening with valves 21 and 23 closed, liquid can be drained from the barrel 9 through lines 25 and 27 and valve 29 to a holding vessel (not shown) or can be pressured out using the same exit lines for the liquid and introducing the pressuring gas through a system such as line 17 and valve 19. Upon clearing the vessel of liquid, pressure can be vented from the barrel 9 through line 17 and valve 19. Upon sufficient reduction of pressure in the barrel the closure 31 here shown as a screw-type closure, can be removed. Closures of other types such as interrupted thread or blind flange can also be used. Experience has shown that with the screw-type closure contemplated in this example the pressure in the barrel must be reduced to about 1 psig to permit operation of the closure to open the vessel.

To this system the present invention adds a safety interlock apparatus which operates as follows. Consider that valves 21 and 23 are closed, that liquid has been drained from the barrel 9 and pressure is being reduced by venting pressuring gas through line 17 and valve 19. As the pressure decreases a signal generating device 33 generates an over-riding signal to the controller 35 of valve 23 which operates the valve to effect the closed position. The controls for the valve are set so that the over-ride maintaining the closed position cannot be removed until the pressure within barrel 9 again attains a setpoint. This is true no matter what signal comes to the control 35 sent through line 37, the usual operational control of valve 23.

Similarly, a pressure indicating transmitter can be used as a signal generating device 33 to transmit a signal to an electric lock 41 which can be set to respond to prevent operation of means for opening the vessel until a predetermined operating pressure is reached within the barrel of the launcher. For this operation the lock would remain in operation until the pressure dropped below a predetermined point and the lock will again be in operation when the pressure was raised to the selected point. By choosing a setpoint of about ½ to about 1 psig it can be assured that the vessel is free of dangerous pressure levels before the operation of opening the vessel can begin. Using the locking device in conjunction with over-rides on the inlet and outlet flow valves can assure that at a certain pressure level no flow of pressured material can enter the vessel and that the pressure must be decreased from that point before the vessel can be opened.

Another specific operating condition that can be used for operating over-rides to prevent inlet or outlet flow valves from opening is to provide a limiting switch 43 on the closure for the vessel which operates when the closure is removed from the closed position to cause generation of a signal 45 that operates to over-ride the operation of valves 21 and 23 so that they automatically act to effect the closed position and remain in that position until signaled that the closure is back in place.

I claim:

1. A method for effecting a safety interlock for a system comprising a vessel with a removable closure and interconnecting operating fluid flow lines for pressuring said vessel with fluid said lines containing automatically controlled valves to control fluid flow, said method comprising:
   (a) generating a signal indicative of an operating condition of said vessel,
   (b) automatically initiating operation to effect a closed position of the controlled valves on said fluid flow lines when the signal indicates said operating condition outside predetermined limits, and
   (c) fixedly maintaining said closed position until the operating condition is re-established within said predetermined limits.

2. A method of claim 1 wherein said operating condition is the pressure within said vessel.

3. A method of claim 1 wherein said operating condition is the positioning of said closure.

4. A method according to claim 1 wherein said vessel is a pipeline pig launcher or receiver.

5. In a system comprising a vessel with a removable closure and interconnecting operating fluid flow lines for pressuring said vessel with fluid said lines containing valves with control means to control fluid flow, a safety interlock apparatus comprising:
   (a) a means for generating a signal indicative of an operating condition of said vessel; and
   (b) said control means for said valves on said fluid flow lines responsive to said signal automatically both to effect closed position of said valves and fixedly to maintain said closed position of said valves until the operating condition is re-established within predetermined limits.

6. An apparatus of claim 5 further provided with a controlled locking device on said closure, said controlled locking device responsive to a signal indicating pressure within said vessel and effecting locking of said closure in closed position at pressures above a preselected pressure.

7. An apparatus of claim 5 comprising a valve in a fluid flow bypass line around a flow control valve, said bypass suitable for pressuring said vessel.

8. An apparatus of claim 7 wherein there is means to produce a signal indicating said closure is not in closed position with said valve in the bypass around the inlet control valve automatically responsive to said signal indicating the closure is not in position to effect a closed position in the bypass valve until said signal indicates the closure is securely in place.

9. An apparatus of claim 5 wherein said vessel is a pipeline pig launcher or receiver.

* * * * *